(12) United States Patent
Mohammed et al.

(10) Patent No.: US 9,973,358 B1
(45) Date of Patent: May 15, 2018

(54) TIME-BASED AND FREQUENCY-BASED DISTORTION RECOVERY

(71) Applicant: QUALCOMM Incorporated, San Diego, CA (US)

(72) Inventors: Ahmad Abdulrahman Mohammed, Santa Clara, CA (US); Louay Jalloul, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/640,194

(22) Filed: Jun. 30, 2017

(51) Int. Cl.
*H04B 7/10* (2017.01)
*H04L 25/03* (2006.01)
*H04L 27/38* (2006.01)
*H04L 27/26* (2006.01)

(52) U.S. Cl.
CPC .. *H04L 25/03057* (2013.01); *H04L 25/03159* (2013.01); *H04L 27/265* (2013.01); *H04L 27/3863* (2013.01); *H04L 2025/03426* (2013.01); *H04L 2025/03668* (2013.01)

(58) Field of Classification Search
CPC ............. H04L 25/0204; H04L 25/0208; H04L 25/03159; H04L 27/265; H04L 27/2636; H04L 27/01; H04L 2025/03414; H04L 25/0236; H04L 1/0054; H04L 2025/03426; H04L 27/2634; H04L 27/38; H04L 1/005; H04L 2025/03611; H04L 25/03012; H04L 1/0065; H04L 2025/0342; H04L 27/2628
See application file for complete search history.

(56) References Cited

U.S. PATENT DOCUMENTS

2002/0106028 A1* 8/2002 Thyssen ................ H03M 3/388
375/243

* cited by examiner

*Primary Examiner* — Rahel Guarino
(74) *Attorney, Agent, or Firm* — Toler Law Group, PC.

(57) ABSTRACT

A method includes receiving a signal at a receiver device via a channel from a transmitter device and determining a frequency domain representation of the signal. The signal includes multiple modulation symbols. The method further includes detecting a first symbol of the signal and determining a time domain representation of a distortion estimate associated with the first symbol using a distortion recovery receiver (DRR) technique. The method further includes subtracting the distortion estimate from the first symbol to generate an updated estimate of the first symbol. The method further includes determining a frequency domain representation of a second symbol using a value that is based on a frequency domain representation of the distortion estimate and that is further based on a frequency domain representation of a quantized version of the updated estimate of the first symbol.

22 Claims, 6 Drawing Sheets

TIME-BASED AND FREQUENCY-BASED DISTORTION RECOVERY

I. FIELD

This disclosure is generally related to electronic devices and more particularly to electronic devices that communicate using a communication network.

II. DESCRIPTION OF RELATED ART

An electronic device may communicate with one or more other electronic devices using a communication network. For example, a mobile device may use a wireless communication network to communicate with an access point or with another mobile device. An access point may be connected to one or more other communication networks, such as the Internet.

In some circumstances, a signal sent from a transmitter to a receiver is subject to attenuation, such as attenuation due to physical distance between the transmitter and the receiver, channel fading, or other factors. As a result, the signal may be received with a low signal-to-noise ratio (SNR).

A distortion recovery receiver (DRR) technique may allow a power amplifier of the transmitter to distort (e.g., saturate or "clip") a signal. A device that receives the signal may reduce or cancel distortion from the signal using a particular DRR technique. By using the DRR technique, power of a signal output by the power amplifier may be increased, which may enhance the range of the signal, or may increase an SNR associated with the signal, in some cases.

DRR techniques introduce signal distortion that may be computationally complex for the receiver to reduce or cancel. For example, certain techniques to reduce or cancel signal distortion may include performing a large number of iterative operations, which may increase latency, chip area, and power consumption. Other techniques reduce a number of receiver operations using a linear receiver, such as a "zero forcing" (ZF) receiver. Use of a linear receiver may be infeasible in certain applications. For example, a linear receiver may perform poorly when receiving mutually correlated signals, such as multiple-input, multiple-output (MIMO) transmissions that include multiple mutually correlated signals. As a result, DRR techniques may be difficult to implement at a receiver.

III. SUMMARY

In an illustrative example, a method includes receiving a signal at a receiver device, via a channel, from a transmitter device and determining a frequency domain representation of the signal. The signal includes multiple modulation symbols. The method further includes detecting a first symbol of the signal and determining a time domain representation of a distortion estimate associated with the first symbol using a distortion recovery receiver (DRR) technique. The method further includes subtracting the distortion estimate from the first symbol to generate an updated estimate of the first symbol. The method further includes determining a frequency domain representation of a second symbol of the signal using a value that is based on a frequency domain representation of the distortion estimate and that is further based on a frequency domain representation of a quantized version of the updated estimate of the first symbol.

In another illustrative example, an apparatus includes a distortion estimation circuit configured to determine, based on a first symbol of a signal, a time domain representation of a distortion estimate of the first symbol using a distortion recovery receiver (DRR) technique. The apparatus further includes a subtraction circuit configured to subtract a frequency domain representation of the distortion estimate from a frequency domain representation of the first symbol to generate an updated estimate of the first symbol. The apparatus further includes a symbol estimation circuit configured to determine a frequency domain representation of a second symbol of the signal using a value that is based on a frequency domain representation of the distortion estimate and that is further based on a frequency domain representation of a quantized version of the updated estimate of the first symbol.

In another example, an apparatus includes means for determining, based on a first symbol of a signal, a time domain representation of a distortion estimate of the first symbol using a distortion recovery receiver (DRR) technique. The apparatus further includes means for subtracting a frequency domain representation of the distortion estimate from a frequency domain representation of the first symbol to generate an updated estimate of the first symbol. The apparatus further includes means for determining a frequency domain representation of a second symbol of the signal using a value that is based on a frequency domain representation of the distortion estimate and that is further based on a frequency domain representation of a quantized version of the updated estimate of the first symbol.

IV. BRIEF DESCRIPTION OF THE DRAWINGS

V. DETAILED DESCRIPTION

Figure 1A:
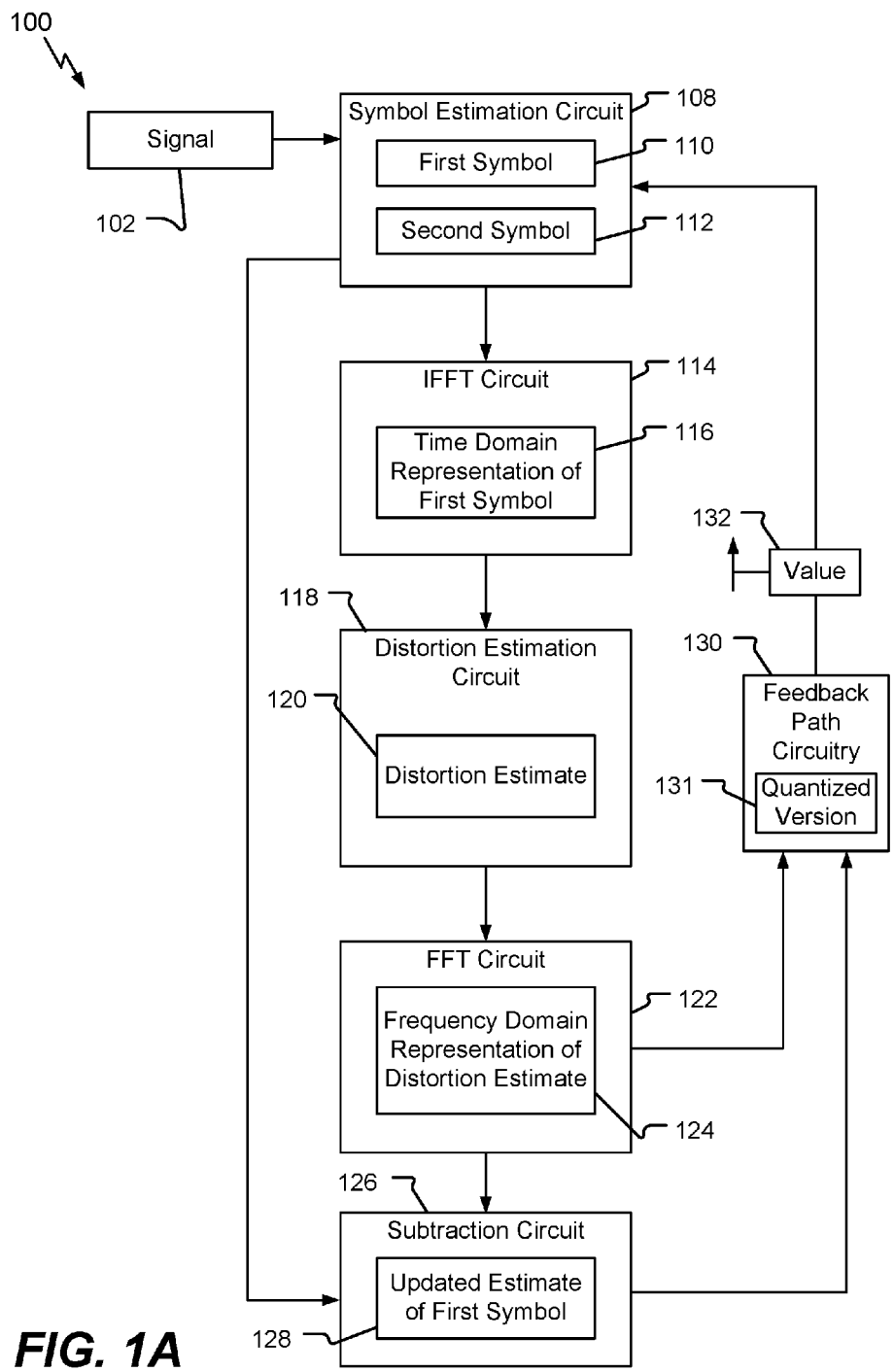
FIG. 1A is a diagram of an illustrative example of a device that is configured to perform time-based and frequency-based distortion recovery.

Aspects of the disclosure are related to a receiver that uses a hybrid technique involving both frequency domain operations and time domain operations to reduce complexity associated with a distortion recovery receiver (DRR) scheme. The receiver is configured to perform distortion cancellation operations using time domain signals. As a result, the receiver may reduce a number of fast Fourier transform (FFT) operations and inverse fast Fourier transform (IFFT) operations typically associated with frequency domain DRR techniques. The receiver also performs other operations using frequency domain signals, which enables the receiver to use a non-linear receive technique, which may be advantageous in certain applications, such as certain multiple-input, multiple-output (MIMO) applications that use mutually correlated wireless signals.

In a particular example, the receiver is configured to determine a distortion estimate associated with a first stream of the MIMO transmission using an iterative technique. The distortion estimate may be used during processing of a second stream of the MIMO transmission. As a result, distortion estimation operations may "converge" faster by initializing distortion estimate operations associated with one stream using a previous distortion estimate of another stream as compared to a technique in which distortion estimates of each stream are processed independently.

In certain implementations, the hybrid technique uses a reduced number of operations to transform data from the frequency domain to the time domain (i.e., an IFFT-FFT "pair"). For example, the number of IFFT-FFT pairs corresponds to a number of transmit chains of a transmitter of the MIMO transmission, which may be less than a number of IFFT-FFT pairs associated with certain conventional techniques. The receiver may include a non-linear decision feedback equalization (DFE) detector, which may feature improved performance as compared to certain other techniques, such as a "zero-forcing" (ZF) equalization technique. In a particular example, distortions of streams are cancelled subsequently rather than simultaneously (e.g., serially rather than in parallel), which may enable use of nonlinear DFE detectors for enhanced robustness (e.g., in correlated MIMO channels). Other illustrative aspects are described below with reference to the drawings.

Referring to FIG. 1, a particular illustrative example of a device is depicted and generally designated 100. The device 100 is configured to perform time-based and frequency-based distortion recovery. In an illustrative implementation, the device 100 is integrated within a receiver, such as a non-linear receiver. Depending on the particular implementation, one or more aspects of the device 100 may be implemented in a mobile device (e.g., a cellular phone), a computer (e.g., a server, a laptop computer, a tablet computer, or a desktop computer), a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The device 100 includes a symbol estimation circuit 108. The symbol estimation circuit 108 is configured to receive signals from electronic devices via a wireless communication network. For example, the symbol estimation circuit 108 is configured to receive a signal 102. In a particular example, the signal 102 corresponds to a multiple-input, multiple-output (MIMO) transmission that is sent based on orthogonal frequency division multiplexing (OFDM) technique.

The device 100 further includes an inverse fast Fourier transform (IFFT) circuit 114 and a distortion estimation circuit 118. The IFFT circuit 114 includes an input coupled to an output of the symbol estimation circuit 108 and further includes an output coupled to an input of the distortion estimation circuit 118.

The device 100 further includes a fast Fourier transform (FFT) circuit 122 and a subtraction circuit 126. The FFT circuit 122 includes an input coupled to an output of the distortion estimation circuit 118 and further includes an output coupled to a first input of the subtraction circuit 126. The subtraction circuit 126 is coupled to the symbol estimation circuit 108. For example, a second input of the subtraction circuit 126 may be coupled to an output of the symbol estimation circuit 108, and an output of the subtraction circuit 126 may be coupled to an input of the symbol estimation circuit 108 via feedback circuitry 130. The feedback circuitry 130 may be coupled to the FFT circuit 122.

During operation, the symbol estimation circuit 108 may determine a first symbol 110 based on the signal 102. For example, the symbol estimation circuit 108 may be configured to perform a MIMO detection operation (e.g., using a non-linear technique) to detect the first symbol 110. In a non-limiting illustrative example, the first symbol 110 corresponds to a symbol of a quadrature amplitude modulation (QAM) codebook. In other implementations, the first symbol 110 may correspond to a symbol of another codebook.

The IFFT circuit 114 is configured to determine a time domain representation 116 of the first symbol 110. For example, the IFFT circuit 114 may be configured to perform an IFFT operation to transform the first symbol 110 from a frequency domain representation to the time domain representation 116.

The distortion estimation circuit 118 is configured to determine, based on the time domain representation 116 of the first symbol 110, a time domain representation of a distortion estimate 120 associated with the signal 102 using a distortion recovery receiver (DRR) technique. In a particular example, the distortion estimation circuit 118 is configured to determine the distortion estimate 120 using the DRR technique by accessing a power amplifier (PA) non-linearity lookup table (LUT), such as by accessing the PA non-linearity LUT to identify the distortion estimate 120 using the first symbol 110 as an index value of the LUT.

The FFT circuit 122 is configured to determine a frequency domain representation 124 of the distortion estimate 120. For example, the FFT circuit 122 may perform an FFT operation to transform the distortion estimate 120 from a time domain representation to the frequency domain representation 124.

The subtraction circuit 126 is configured to subtract the frequency domain representation 124 of the distortion estimate 120 from a frequency domain representation of the first symbol 110 to generate an updated estimate 128 of the first symbol 110. For example, subtraction circuit 126 may "clean" the first symbol 110 of signal components corresponding to the distortion estimate 120 to generate the updated estimate 128 of the first symbol 110. To further illustrate, a transmitter that transmits the signal 102 may distort (e.g., "clip") the signal 102 at a PA stage of the transmitter, and the device 100 may use the subtraction circuit 126 to reduce or remove the distortion (e.g., to "clean" the distortion) from the signal 102. By adding distortion to the signal 102 (at the transmitter) and cleaning distortion from the signal 102 (at the receiver), efficiency of headroom usage may be increased in some communication systems as compared to a technique that reduces signal amplitude to avoid signal distortion.

The symbol estimation circuit 108 is configured to determine a frequency domain representation of a second symbol 112 of the signal 102 using a value 132 that is based on the frequency domain representation 124 of the distortion estimate 120 and that is further based on a frequency domain representation of a quantized version 131 of the updated estimate 128 of the first symbol 110. To illustrate, the feedback circuitry 130 may generate the value 132 by summing the frequency domain representation 124 of the distortion estimate 120 and a frequency domain representation of the quantized version 131 (e.g., a "sliced" version of the updated estimate 128 of the first symbol 110). In a particular example, the symbol estimation circuit 108 is configured to determine the first symbol 110 and the second symbol 112 in accordance with a non-linear decision feedback equalization (DFE) technique.

In a particular example, the device 100 is configured to receive N streams (where N indicates an integer greater than one) of the signal 102 (e.g., via a MIMO transmission) and to perform certain operations associated with the N streams in series (e.g., by processing a second stream of the N streams after performing certain operations associated with a first stream of the N streams). In an illustrative example, the data representing the N streams may be stored at a memory (e.g., a buffer) of the device 100 upon receiving the MIMO transmission. In this example, data representing the first stream may be accessed from the buffer and processed to generate the distortion estimate 120, and data representing the second stream may be accessed from the buffer after generating the distortion estimate 120.

One or more aspects of FIG. 1A may improve performance of a receiver in a wireless communication system. For example, performing distortion reduction for multiple streams serially (instead of concurrently) may enable use non-linear DFE, which may feature improved performance as compared to certain other techniques (e.g., in connection with correlated MIMO channels).

Figure 1B:
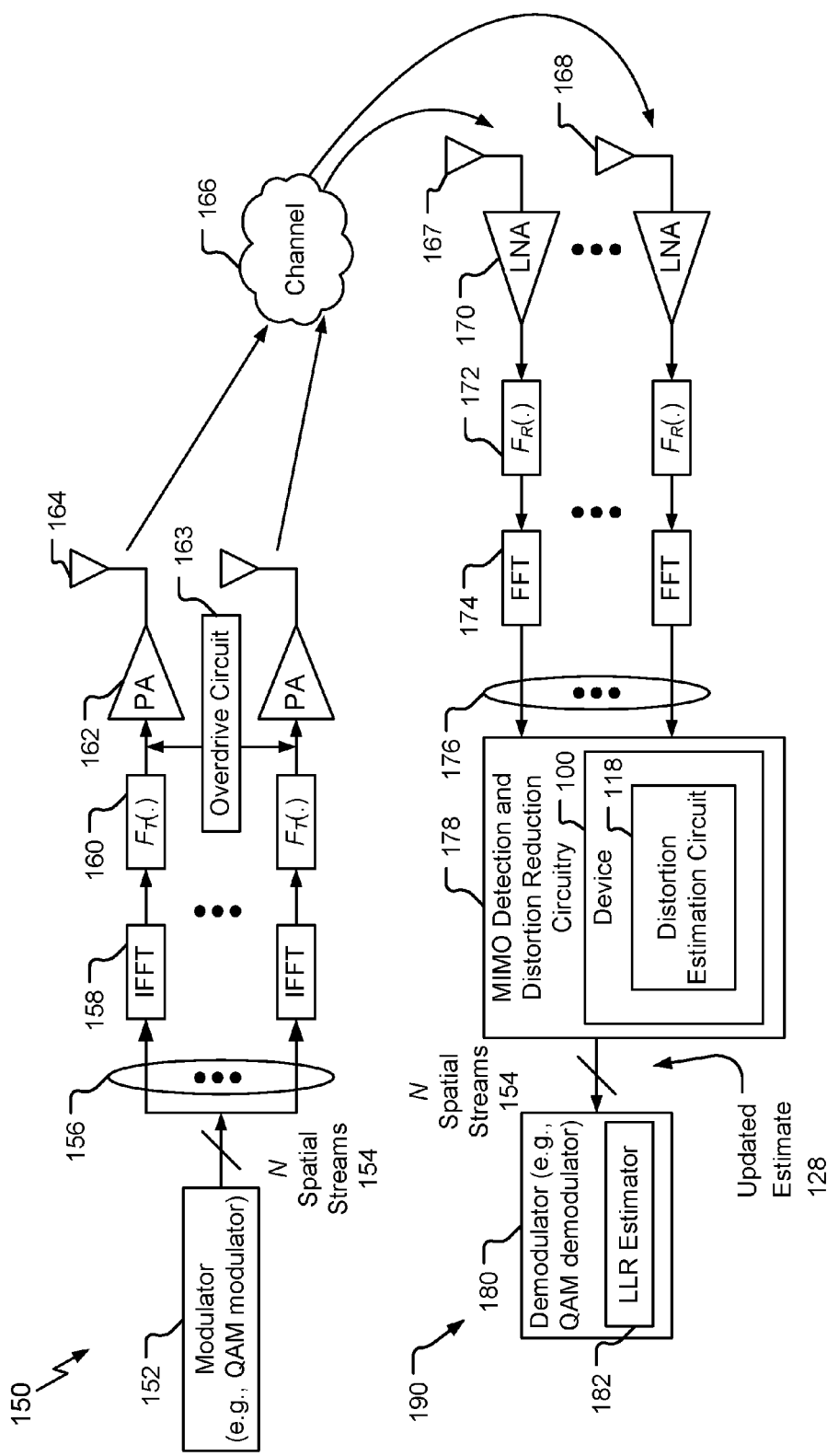
FIG. 1B is a diagram depicting an illustrative example of a system that includes the device of FIG. 1.

FIG. 1B depicts an illustrative example of a system that includes a transmitter 150 and a receiver 190. The receiver 190 includes the device 100 of FIG. 1.

The transmitter 150 and the receiver 190 are configured to communicate via one or more channels, such as a channel 166. The channel 166 may be included in a wireless communication network, such as a wireless local area network (WLAN). The channel 166 may be associated with a wireless communication network that is based on one or more communication protocols. As an example, the channel 166 may be included in a wireless communication network that is based on an Institute of Electrical and Electronics Engineers (IEEE) communication protocol, such as an IEEE 802.11ax communication protocol.

The transmitter 150 includes a modulator 152. In a particular example, the modulator 152 corresponds to a QAM modulator that is configured to generate symbols of a QAM codebook. The modulator 152 may be configured to generate N spatial streams 154 (where N indicates a positive integer greater than one).

The transmitter 150 includes a plurality of transmit chains 156 configured to receive the N spatial streams 154. Each transmit chain of the plurality of transmit chains 156 may be configured to receive a corresponding spatial stream of the N spatial streams 154.

Each transmit chain 156 may include an IFFT circuit, a transmit circuit, a power amplifier, and an antenna. To illustrate, FIG. 1B depicts that a particular transmit chain of the plurality of transmit chains 156 may include a representative IFFT circuit 158, a representative transmit circuit 160, a representative power amplifier 162, and a representative antenna 164. Each transmit circuit the transmitter 150 may be configured to perform certain operations (indicated in FIG. 1B as $F_T$), such as one or more of cyclic prefix (CP) insertion, digital-to-analog (DAC) conversion, filtering, or up-conversion, as illustrative examples.

In a particular example, the transmitter 150 includes an overdrive circuit 163 configured overdrive power amplifiers of the transmitter 150 to generate a distortion component in a corresponding stream of the N spatial streams 154. For example, the overdrive circuit 163 may be configured to overdrive the power amplifier 162 to generate a first stream of the N spatial streams 154. As another example, the overdrive circuit 163 may be configured to overdrive another power amplifier of the transmitter 150 to generate a second stream of the N spatial streams 154. Each antenna of the transmitter 150 may be configured to send a respective stream of a MIMO transmission to the receiver 190 via the channel 166.

The receiver 190 includes a plurality of receive chains 176 configured to receive the MIMO transmission from the transmitter 150 via the channel 166. Each receive chain of the plurality of receive chains 176 may include an antenna, a low noise amplifier (LNA), a receive circuit, and an FFT circuit. To illustrate, FIG. 1B depicts that a particular receive chain of the plurality of receive chains 176 may include a representative antenna 167, a representative LNA 170, a representative receive circuit 172, and a representative FFT circuit 174. Each receive circuit of the receiver 190 may be configured to perform certain operations (indicated in FIG. 1B as FR), such as one or more of down-conversion, filtering, analog-to-digital (ADC) conversion, or CP removal, as illustrative examples.

FIG. 1B also illustrates an antenna 168. In an illustrative example, the antenna 167 is included in an Nth receive chain of the plurality of receive chains 176, and the antenna 168 is included in an (N−1)th receive chain of the plurality of receive chains 176.

The receiver 190 includes MIMO detection and distortion reduction circuitry 178 coupled to each receive chain of the plurality of receive chains 176. The MIMO detection and distortion reduction circuitry 178 includes the device 100 of FIG. 1A (and the distortion estimation circuit 118 of FIG. 1A). The MIMO detection and distortion reduction circuitry 178 is configured to perform detection and distortion reduction operations to generate (e.g., "recover") the N spatial streams 154. A particular spatial stream of the N spatial streams 154 may include the updated estimate 128 of the first symbol 110 of FIG. 1A.

The receiver 190 further includes a demodulator 180 configured to demodulate the updated estimate 128 of the first symbol 110 and to demodulate an updated estimate of the second symbol 112. In a particular example, the demodulator 180 is configured to demodulate QAM symbols of a QAM codebook. For example, the updated estimate 128 of the first symbol 110 may correspond to a particular QAM symbol, and the demodulator 180 may configured to demodulate QAM symbols. In other implementations, the demodulator 180 may be configured to operate according to one or more other techniques.

One or more aspects of FIG. 1B may improve performance of a receiver in a wireless communication system. For example, by using a distortion estimate during estimation of a subsequent symbol, performance may be enhanced as compared to a device that independently estimates symbols of multiple streams.

Figure 2:
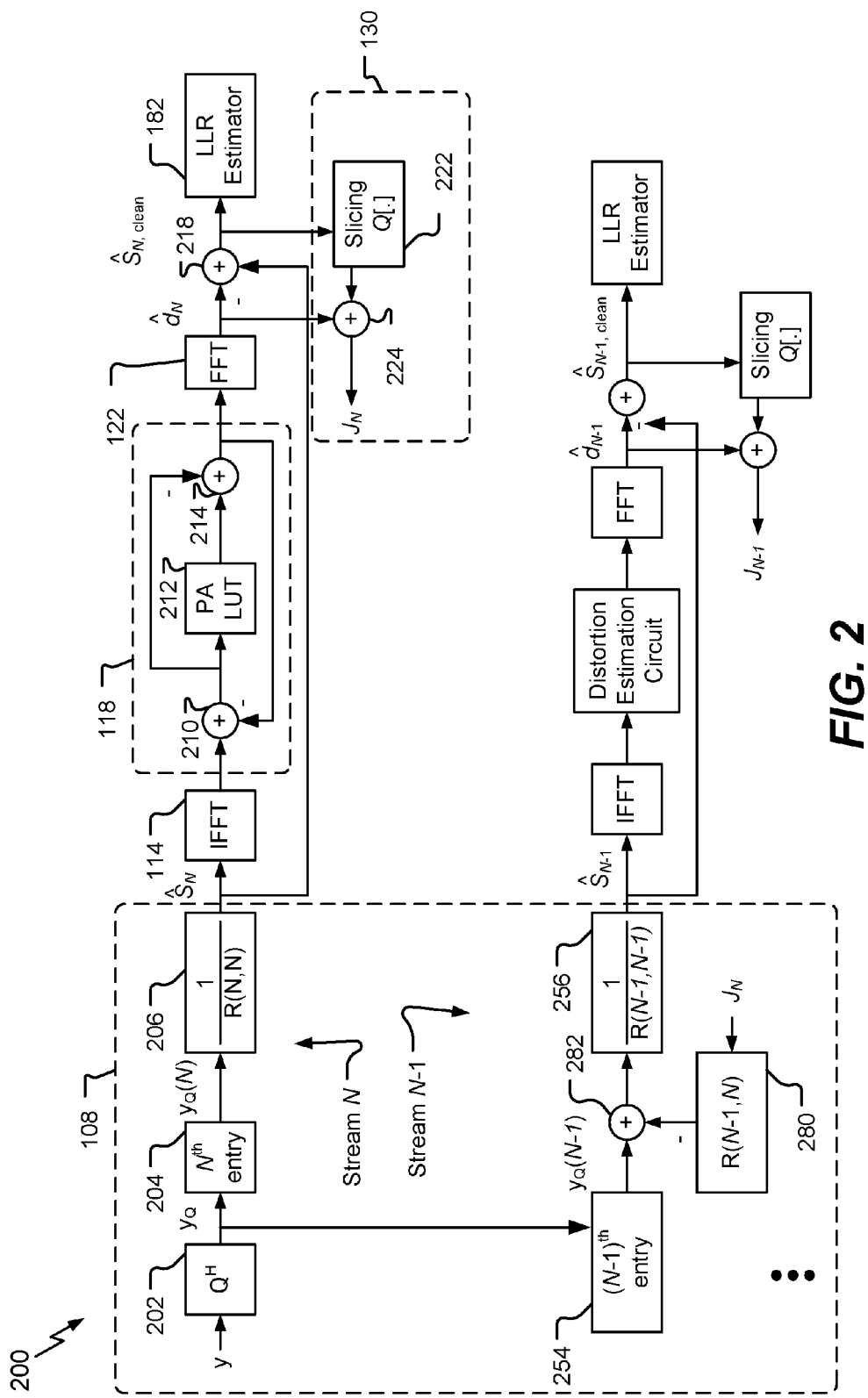
FIG. 2 is a diagram illustrating certain aspects of illustrative examples of components that may be included in the device of FIG. 1.

Referring to FIG. 2, certain illustrative examples of components that may be included in the device 100 of FIG. 1A are depicted and generally designated 200. In a particular example, components 200 illustrated in the top half of FIG. 2 may be associated with an Nth stream of the signal 102 of FIG. 1A, and components 200 illustrated in the bottom half of FIG. 2 may be associated with an (N−1)th stream of the signal 102 of FIG. 1A. In a particular example, the antenna 167 of FIG. 1B is configured to receive the Nth stream via a MIMO transmission from the transmitter 150, and the antenna 168 is configured to receive the (N−1)th stream via the MIMO transmission.

In FIG. 2, the components 200 include a circuit 202 configured to receive an input y. The input y may include a vector, such as an N×1 vector. The input y may correspond to the signal 102 of FIG. 1A. The circuit 202 is configured to multiply the input y by a matrix $Q^H$ (where H indicates a Hermitian operator) to generate an output $y_Q$. For example, the channel 166 of FIG. 1B may correspond to a channel matrix H that can be decomposed into H=QR (where Q and R indicate matrices).

The components 200 are configured to select a signal $y_Q(N)$ associated with the Nth stream, at 204. The components 200 are configured to multiply the signal $y_Q(N)$ by a factor 1/(R(N,N)) to generate a symbol $\hat{s}_N$ (e.g., the first symbol 110), at 206.

The components 200 are configured to perform IFFT operations using the symbol $\hat{s}_N$ to generate a time domain representation of the symbol $\hat{s}_N$. For example, the IFFT circuit 114 may be configured to transform the symbol $\hat{s}_N$ from a frequency domain representation to a time domain representation, such as the time domain representation 116 of FIG. 1.

The components 200 of FIG. 2 are configured to perform one or more distortion estimation operations for the Nth stream in accordance with a DRR technique. To illustrate, FIG. 2 depicts that the distortion estimation circuit 118 may include a first subtraction circuit 210, a lookup table circuit 212, and a second subtraction circuit 214. The first subtraction circuit 210 may be configured to generate a feedforward value based on the time domain representation of the symbol $\hat{s}_N$, and the lookup table circuit 212 may be configured to determine a lookup value based on the feedforward value. The second subtraction circuit 214 may be configured to subtract the feedforward value from the lookup value to generate the time domain representation of the distortion estimate (e.g., the distortion estimate 120).

In some implementations, the lookup table circuit 212 includes (or is configured to access) a lookup table of values of distortion components that may be added to signals by the transmitter 150 using the overdrive circuit 163 of FIG. 1B. To illustrate, the lookup table may be provided by the transmitter 150 to the receiver 190 (e.g., during a "handshake" procedure) or may be specified by a wireless communication protocol, as illustrative examples.

In some implementations, the distortion estimation circuit 118 is configured to perform multiple iterations of a distortion estimation operation to estimate a distortion component. For example, after determining a first estimate of a distortion component using a first iteration of a distortion estimation operation, the distortion estimation circuit 118 may "refine" the first estimate using one or more additional iterations of the distortion estimation operation, such as using a second iteration to determine a second estimate of the distortion component. In some implementations, the distortion estimation circuit 118 is configured to perform iterations of the distortion estimation operation until the distortion component "converges" to a particular value (or until the distortion estimation operation reaches a threshold number of iterations).

The components 200 of FIG. 2 are configured to perform FFT operations based on results of the distortion estimation operations to generate a frequency domain representation $\hat{d}_N$ of the distortion estimate. For example, the FFT circuit 122 may be configured to receive an output of the second subtraction circuit 214 and to transform the output from a time domain representation to the frequency domain representation $\hat{d}_N$. In a particular example, the frequency domain representation $\hat{d}_N$ corresponds to the frequency domain representation 124.

The components 200 are further configured to "clean" the symbol $\hat{s}_N$ of the distortion estimate to generate an updated estimate $\hat{s}_{N,clean}$. For example, a subtraction circuit 218 may subtract the frequency domain representation $\hat{d}_N$ from the symbol $\hat{s}_N$ to generate the updated estimate $\hat{s}_{N,clean}$ (e.g., the updated estimate 128). In a particular example, the LLR estimator 182 may be configured to receive the updated estimate $\hat{s}_{N,clean}$. The components 200 are further configured to generate a value $J_N$ that is based on the frequency domain representation $\hat{d}_N$ and the updated estimate $\hat{s}_{N,clean}$. For example, the components 200 may include a slicer circuit 222 and an addition circuit 224. The slicer circuit 222 may be coupled to an output of the subtraction circuit 218 and may be configured to generate a sliced value (e.g., the quantized version 131) based on the updated estimate $\hat{s}_{N,clean}$. The addition circuit 224 may be coupled to an output of the FFT circuit 122 and to an output of the slicer circuit 222. The addition circuit 224 may be configured to generate the value $J_N$ (e.g., the value 132) based on the sliced value and the frequency domain representation $\hat{d}_N$.

FIG. 2 further illustrates that the components 200 may use the value $J_N$ to determine one or more subsequent symbols. For example, the components 200 may be configured to perform a scaling operation based on the value $J_N$ and a factor (R(N−1,N−1)) to generate a second value based on one or more processed streams (e.g., the Nth stream), at 280. The components 200 may be configured to select a signal $y_Q(N-1)$ associated with the (N−1)th stream, at 254, and to perform a subtraction operation, at 282, to subtract the second value from the signal $y_Q(N-1)$. The components 200 are configured to determine a second symbol based on the second value. For example, the components 200 may be configured to multiply the signal $y_Q(N-1)$ by a factor 1/(R(N−1,N−1)), at 256, to determine a symbol $\hat{s}_{N-1}$ (e.g., the second symbol 112) based on the second value.

The components 200 may be configured to perform an IFFT operation using the symbol $\hat{s}_{N-1}$ to generate a time domain representation of the symbol $\hat{s}_{N-1}$. The components 200 may also be configured to perform, for the (N−1)th stream, one or more distortion estimation operations in accordance with a DRR technique to generate a time domain representation of the symbol $\hat{s}_{N-1}$. The components 200 of FIG. 2 are configured to perform an FFT operation to generate a frequency domain representation $\hat{d}_{N-1}$ of a distortion estimate and to "clean" the symbol $\hat{s}_{N-1}$ of the distortion estimate to generate updated an estimate $\hat{s}_{N-1,clean}$ (e.g., an updated estimate of the second symbol 112). The components 200 are further configured to generate a value $J_{N-1}$ based on the frequency domain representation $\hat{d}_{N-1}$ and the updated estimate $\hat{s}_{N-1,clean}$. The components 200 may be configured to use the value $J_{N-1}$ in connection with a subsequent symbol estimation operation $J_{N-1}$, such as an operation to estimate a symbol associated with an (N−2)th stream of the signal 102.

In FIG. 2, the symbol $\hat{s}_{N-1}$ is generated based on a distortion estimate associated with the Nth stream (e.g., using the value $J_N$). By generating a symbol based on a previous distortion estimate, receiver performance may be improved. For example, distortion estimation operations may "converge" faster when an initial estimate of the symbol $\hat{s}_{N-1}$ is based on previous distortion estimates as compared to a technique in which distortion estimates of each stream are processed independently.

Figure 3:
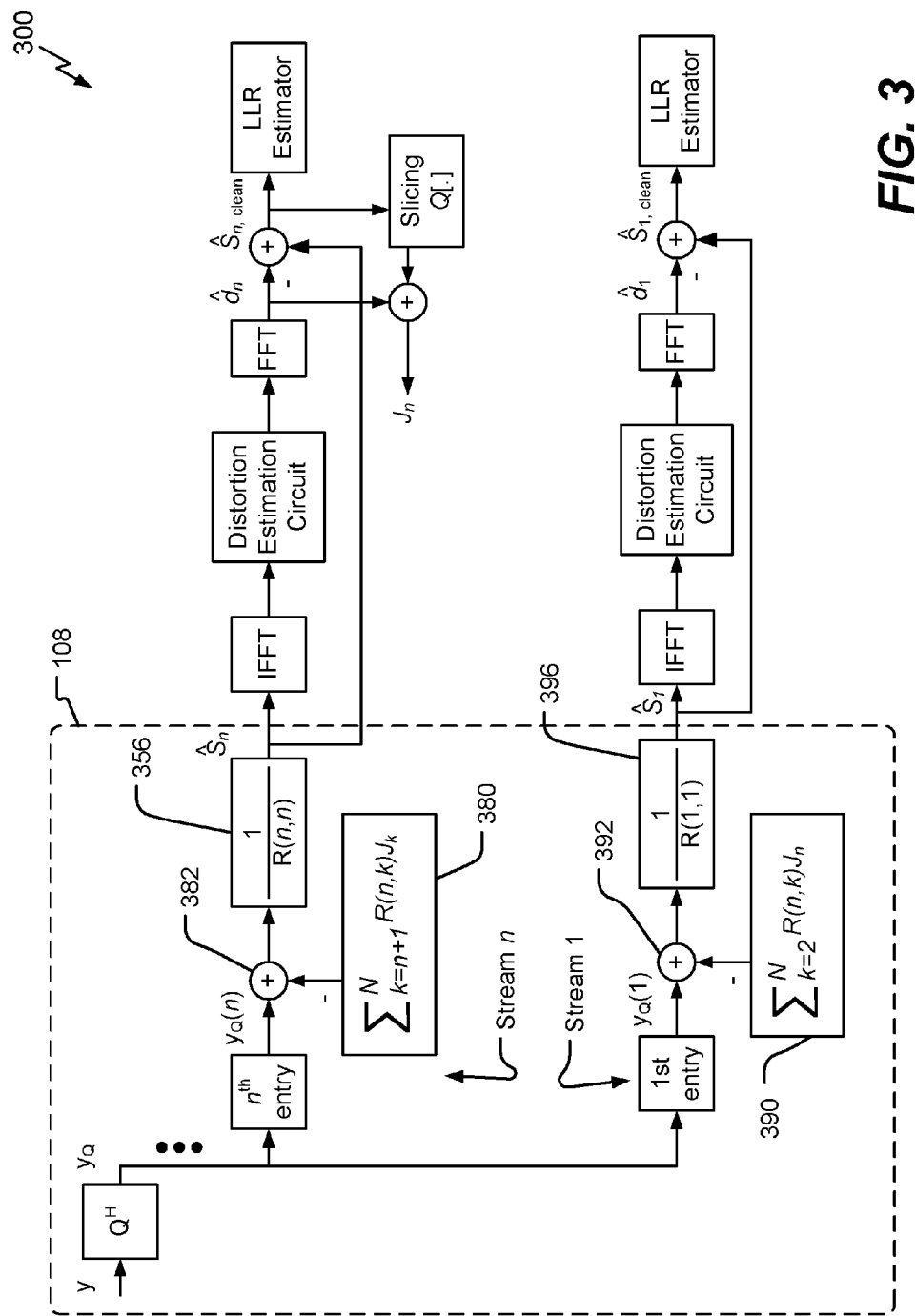
FIG. 3 is another diagram illustrating certain aspects of illustrative examples of additional components that may be included in the device of FIG. 1.

Referring to FIG. 3, certain illustrative examples of components that may be included in the device 100 of FIG. 1A are depicted and generally designated 300. In a particular example, components 300 illustrated in the top half of FIG. 2 may be associated with an nth stream of the signal 102 of FIG. 1A, and components 300 illustrated in the bottom half of FIG. 2 may be associated with a 1st stream of the signal 102 of FIG. 1A (where 1<n<N).

In FIG. 3, certain operations performed with respect to the nth stream and the 1st stream may be as described with reference to the Nth stream and the (N−1)th stream of FIG. 2. For example, referring to the nth stream, the components 300 may be configured to select a signal $y_Q(n)$ associated with the nth stream, to multiply the signal $y_Q(n)$ by a factor $1/(R(n,n))$ to generate a symbol $\hat{s}_n$, and to transform the symbol $\hat{s}_n$ from a frequency domain representation to a time domain representation. The components 300 may be further configured to generate a distortion estimate based on the symbol $\hat{s}_n$ and to generate a frequency domain representation $\hat{d}_n$ of the distortion estimate. The components 300 may be further configured to "clean" the symbol $\hat{s}_n$ of the distortion estimate to generate an updated estimate $\hat{s}_{n,clean}$ and a value $J_n$ based on a sliced value of the updated estimate $\hat{s}_{n,clean}$ and the frequency domain representation.

In addition, referring to the 1st stream, the components 300 may be configured to select a signal $y_Q(1)$ associated with the 1st stream, to multiply the signal $y_Q(1)$ by a factor $1/(R(1,1))$ to generate a symbol $\hat{s}_1$, and to transform the symbol $\hat{s}_1$ from a frequency domain representation to a time domain representation. The components 300 may be further configured to generate a distortion estimate based on the symbol $\hat{s}_1$ and to generate a frequency domain representation $\hat{d}_1$ of the distortion estimate. The components 300 may be further configured to "clean" the symbol $\hat{s}_1$ of the distortion estimate to generate an updated estimate $\hat{s}_{1,clean}$.

FIG. 3 further illustrates that the components 300 may use the value $J_n$ to determine one or more subsequent symbols. For example, the components 300 may be configured to perform a scaling operation based on the value $J_k$ to generate a second value (e.g., a weighted summation value) based on one or more processed streams (e.g., based on the Nth stream and the (N−1)th stream of FIG. 2), at 380. The components 300 may be configured to perform a subtraction operation to subtract the second value from the signal $y_Q(n)$, at 382. The components 300 are configured to determine a second symbol based on the second value. For example, the components 300 may be configured to multiply the signal $y_Q(n)$ by a factor $1/(R(n,n))$, at 356, to determine the symbol $\hat{s}_n$ based on the second value.

FIG. 3 also shows that the components 300 may use the value $J_n$ to determine one or more subsequent symbols. For example, the components 300 may be configured to perform a scaling operation based on the value $J_n$ to generate a second value (e.g., a weighted summation value) based on one or more processed streams (e.g., based on the Nth stream, the (N−1)th stream, and the nth stream), at 390. The components 300 may be configured to perform a subtraction operation to subtract the second value from the signal $y_Q(1)$, at 392. The components 300 are configured to determine a second symbol based on the second value. For example, the components 300 may be configured to multiply the signal $y_Q(1)$ by a factor $1/(R(1,1))$, at 396, to determine the symbol $\hat{s}_1$ based on the second value.

In FIG. 3, the symbols $\hat{s}_n$, $\hat{s}_1$ are generated based on distortion estimates associated with other streams (e.g., a distortion estimate associated with a particular stream may be "shared" with another stream). For example, the symbol $\hat{s}_n$ is generated based on a value $J_k$ (where k=n+1). As another example, the symbol the symbol $\hat{s}_1$ is generated based on the value $J_n$.

By generating symbols based on previous distortion estimates, receiver performance may be improved. For example, distortion estimation operations may "converge" faster when an initial estimate of a symbol is based on a previous distortion estimate as compared to a technique in which distortion estimates of each stream are processed independently.

To further illustrate certain aspects of FIGS. 2 and 3, in a particular example, the symbol estimation circuit 108 is configured to determine the symbol $\hat{s}_N$ in accordance with Equation 1:

$$\hat{s}_N = \frac{y_Q(N)}{R(N,N)} = s_N + d_N + \frac{w(N)}{R(N,N)} \qquad \text{(Equation 1)}$$

In Equation 1, $d_N$ indicates a distortion estimate (e.g., the distortion estimate 120) of the Nth stream, and w(N) indicates a noise component associated with the Nth stream, such as thermal white noise associated with the channel 166. After determining the symbol $\hat{s}_N$, the distortion estimate $d_N$ may be determined and converted from a time domain representation to a frequency domain representation in accordance with the illustrative pseudo-code of Example 1:

$\hat{s}_{TD,N,0} = IFFT(\hat{s}_N)$ for $k = 0 : N_{itr}$ $\hat{d}_{TD,N,k} = PA(\hat{s}_{TD,N,k}) - \hat{s}_{TD,N,k}$ $\hat{s}_{TD,N,k+1} = \hat{s}_{TD,N,k} - \hat{d}_{TD,N,k}$ end $\hat{d}_N = FFT(\hat{d}_{TD,N,N_{itr}})$ In Example, 1, a time domain representation of the symbol $\hat{s}_N$ is converted to a time domain representation $\hat{s}_{TD,N,0}$. A particular number of iterations $N_{itr}$ may be performed to determine a time domain representation $\hat{d}_{TD,N,k}$ of a distortion estimate based on a lookup table value (PA) and a time domain representation $\hat{s}_{TD,N,k}$ and to determine a time domain representation $\hat{s}_{TD,N,k+1}$ based on time domain representation $\hat{s}_{TD,N,k}$ and based on the time domain representation $\hat{d}_{TD,N,k}$ of the distortion estimate. The time domain representation $\hat{d}_{TD,N,N_{itr}}$ may be converted to a frequency domain representation of the distortion estimate $d_N$.

The frequency domain representation of the distortion estimate may be subtracted from the symbol $\hat{s}_n$, such as shown in Equation 2:

$$\hat{s}_{N,clean} = \hat{s}_N - \hat{d}_N \qquad \text{(Equation 2)}$$

The (N−1)th stream may be processed based on the distortion estimate of the Nth stream.

For example, the symbol $\hat{s}_{N-1}$ may be determined in accordance with Equation 3:

$$\hat{s}_{N-1} = \frac{y_Q(N-1) - R(N-1, N)(Q[\hat{s}_{N,clean}] + \hat{d}_N)}{R(N-1, N-1)}$$

$$= s_{N-1} + d_{N-1} + \tilde{e}_{N-1} + \frac{w(N-1)}{R(N-1, N-1)}$$

(Equation 3)

In Equation 3, Q indicates a slicing operation, and $\tilde{e}_{N-1}$ indicates an error function that may be associated with one or more of the updated estimate $\hat{s}_{n,clean}$ or the distortion estimate $\hat{d}_N$.

One or more subsequent streams may be processed using results associated with the (N−1)th stream. For example, the nth stream of FIG. 3 may be processed based on the value $J_{N-1}$, and the 1st stream of FIG. 3 may be processed based on the value $J_n$. Subsequent streams may be processed in accordance with Equation 4:

$$\hat{s}_n = \frac{y_Q(n) - \sum_{k=n+1}^{N} R(n, k)(Q[\hat{s}_k] + \hat{d}_k)}{R(n, n)}$$

(Equation 4)

Thus, FIGS. 2 and 3 describe examples in which a distortion estimate may be used in connection with a subsequent stream. One or more examples described with reference to FIGS. 2 and 3 may improve receiver performance as compared to a technique that processes streams independently.

Figure 4:
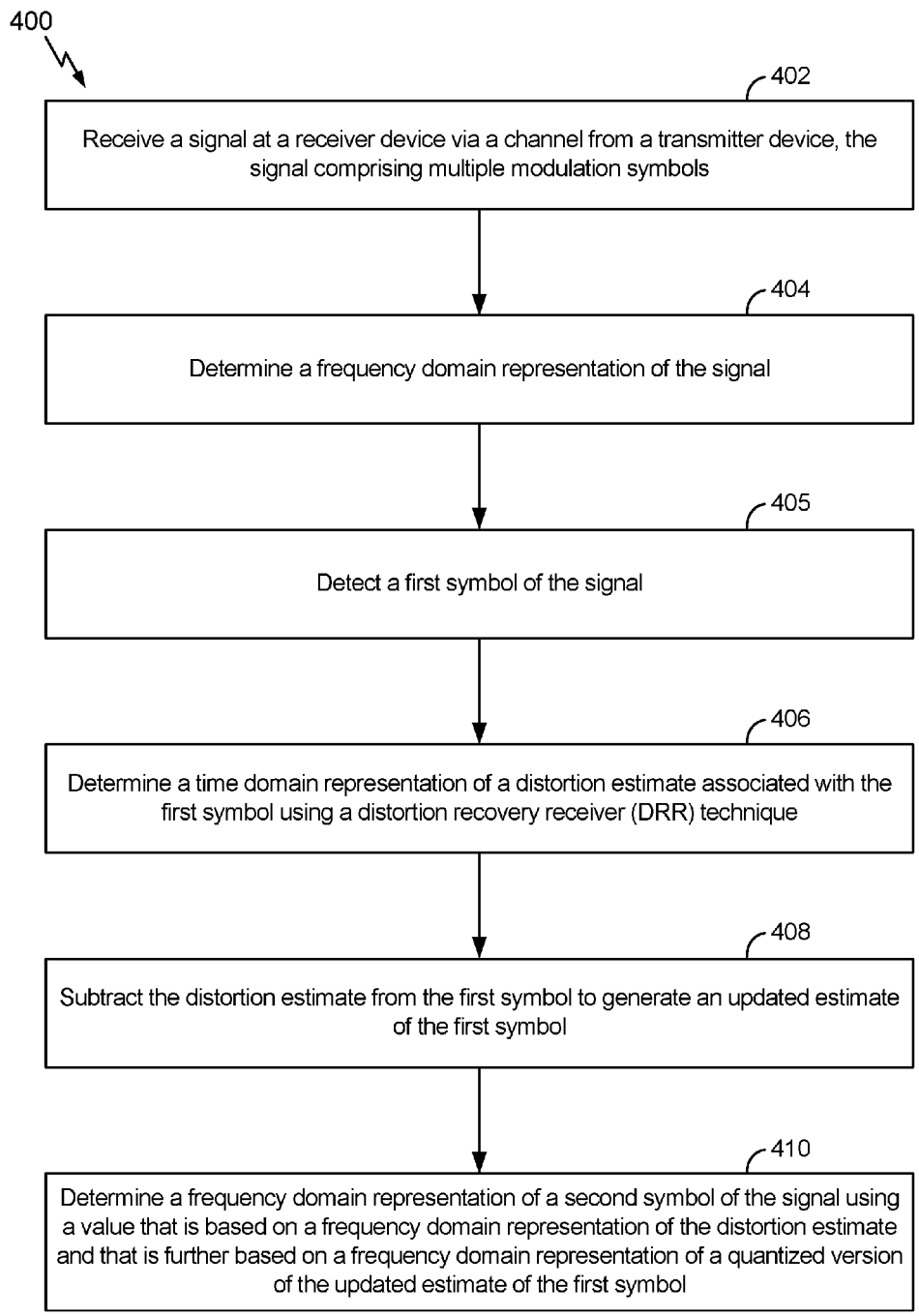
FIG. 4 is a flow chart illustrating an illustrative example of a method of operation of an electronic device that includes the device of FIG. 1.

Referring to FIG. 4, an illustrative example of a method of operation of a receiver device is depicted and generally designated 400. For example, the method 400 may be performed by an electronic device that includes the device 100 of FIG. 1A, the receiver 190 of FIG. 1B, or both.

The method 400 includes receiving a signal at the receiver device via a channel from a transmitter device, at 402. The signal includes multiple modulation symbols, such as QAM modulation symbols, as a particular example. To illustrate, the receiver device may receive a signal from the transmitter 150 via the channel 166 of FIG. 1B.

The method 400 further includes determining a frequency domain representation of the signal, at 404, and detecting a first symbol of the signal, at 405. For example, the receiver device may convert the signal from a time domain representation to a frequency domain representation using one or more FFT circuits (e.g., the FFT circuit 174 of FIG. 1B) and may detect a first symbol of the signal, such as by detecting the first symbol 110 using the symbol estimation circuit 108.

The method 400 further includes determining a time domain representation of a distortion estimate associated with the first symbol using a DRR technique, at 406. For example, the distortion estimation circuit 118 is configured to determine the distortion estimate 120.

The method 400 further includes subtracting the distortion estimate from the first symbol to generate an updated estimate of the first symbol, at 408. For example, the subtraction circuit 126 may be configured to subtract the frequency domain representation 124 of the distortion estimate 120 from the first symbol 110 to generate the updated estimate 128 of the first symbol 110.

The method 400 further includes determining a frequency domain representation of a second symbol of the signal using a value that is based on a frequency domain representation of the distortion estimate and that is further based on a frequency domain representation of a quantized version of the updated estimate of the first symbol, at 410. For example, the symbol estimation circuit 108 may be configured to determine a frequency domain representation of the second symbol 112 using the value 132.

The method 400 of FIG. 4 may improve receive performance as compared certain other techniques. For example, distortion estimation operations may be performed faster or more accurately by "sharing" a distortion estimate from one stream with another stream as compared to a technique in which distortion estimates of each stream are processed independently.

In some implementations, one or more operations of the method 400 are performed, initiated, or controlled by a processor that executes instructions. Certain illustrative aspects of a processor that executes instructions are described further with reference to FIG. 5.

Figure 5:
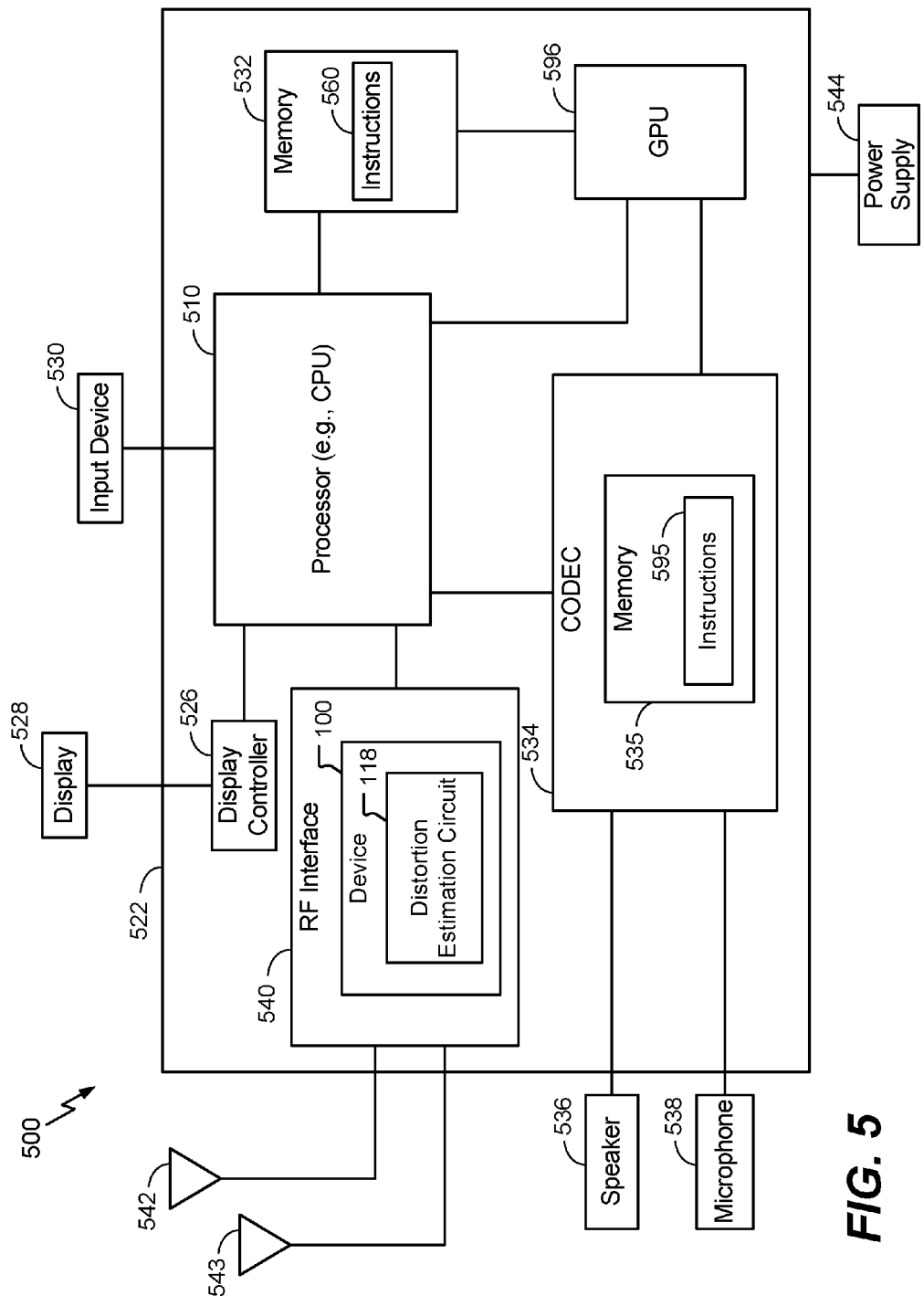
FIG. 5 is a block diagram of an illustrative example of an electronic device that includes the device of FIG. 1.

Referring to FIG. 5, a block diagram of a particular illustrative example of an electronic device is depicted and generally designated 500. Depending on the particular implementation, one or more aspects of the electronic device 500 may be implemented in a mobile device (e.g., a cellular phone), a computer (e.g., a server, a laptop computer, a tablet computer, or a desktop computer), a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 500 includes one or more processors, such as a processor 510 and a graphics processing unit (GPU) 596. The processor 510 may include a central processing unit (CPU), another processing device, or a combination thereof.

The electronic device 500 may further include one or more memories, such as a memory 532. The memory 532 may be coupled to the processor 510, to the GPU 596, or to both. The memory 532 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 532 may store instructions 560. The instructions 560 may be executable by the processor 510, by the GPU 596, or by both. The instructions 560 may be executable to perform, initiate, or control one or more operations described herein. For example, in some implementations, the instructions 560 are executable by the processor 510 or the GPU 596 to perform, initiate, or control one or more operations of the method 400 of FIG. 4. Alternatively or in addition, one or more operations described herein may be performed, initiated, or controlled by one or more other components of the electronic device 500.

In an illustrative example, the electronic device 500 includes a radio frequency (RF) interface 540 (e.g., a transceiver device) that includes the device 100. The RF interface 540 may include one or more other components described herein, such as the receiver 190 of FIG. 1B, the components 200 of FIG. 2, the components 300 of FIG. 3, one or more other components, or a combination thereof. The RF interface 540 may be coupled to an antenna 542 (e.g., the antenna 167 of FIG. 1B or another antenna) and to an antenna 543 (e.g., the antenna 168 of FIG. 1B or another antenna).

A coder/decoder (CODEC) 534 can also be coupled to the processor 510. The CODEC 534 may be coupled to one or more microphones, such as a microphone 538. The CODEC 534 may be coupled to one or more speakers, such as a speaker 536. The CODEC 534 may include a memory 535. The memory 535 may store instructions 595 executable by the CODEC 534.

The electronic device 500 may further include a display 528, such as a touchscreen display, as an illustrative example. FIG. 5 also shows a display controller 526 that is coupled to the processor 510 and to the display 528.

In a particular example, the processor 510, the GPU 596, the memory 532, the display controller 526, the CODEC 534, and the RF interface 540 are included in a system-on-chip (SoC) device 522. Further, an input device 530 and a power supply 544 may be coupled to the SoC device 522. Moreover, in a particular example, as illustrated in FIG. 5, the display 528, the input device 530, the speaker 536, the microphone 538, the antenna 542, the antenna 543, and the power supply 544 are external to the SoC device 522. However, each of the display 528, the input device 530, the speaker 536, the microphone 538, the antenna 542, the antenna 543, and the power supply 544 can be coupled to a component of the SoC device 522, such as to an interface or to a controller.

In conjunction with the described embodiments, an apparatus includes means (e.g., the distortion estimation circuit 118) for determining, based on a first symbol (e.g., the first symbol 110) of a signal (e.g., the signal 102), a time domain representation of a distortion estimate (e.g., the distortion estimate 120) of the first symbol using a DRR technique. The apparatus further includes means (e.g., the subtraction circuit 126) for subtracting a frequency domain representation (e.g., the frequency domain representation 124) of the distortion estimate from a frequency domain representation of the first symbol to generate an updated estimate of the first symbol (e.g., the updated estimate 128 of the first symbol 110). The apparatus further includes means (e.g., the symbol estimation circuit 108) for determining a frequency domain representation of a second symbol (e.g., the second symbol 112) of the signal using a value (e.g., the value 132) that is based on a frequency domain representation of the distortion estimate (e.g., the frequency domain representation 124 of the distortion estimate 120) and that is further based on a frequency domain representation of a quantized version (e.g., the quantized version 131) of the updated estimate of the first symbol.

In a particular illustrative example, the apparatus further includes means (e.g., the IFFT circuit 114) for determining a time domain representation of the first symbol (e.g., the time domain representation 116 of the first symbol 110) and means (e.g., the FFT circuit 122) for determining the frequency domain representation of the distortion estimate. The apparatus may further include means (e.g., the slicer circuit 222) for generating a sliced value based on the updated estimate of the first symbol and means (e.g., the addition circuit 224) for generating the value based on the sliced value and the frequency domain representation of the distortion estimate. The apparatus may further include means (e.g., the demodulator 180) for demodulating the updated estimate of the first symbol and for demodulating an updated estimate of the second symbol.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, "determining" may include one or more of generating, calculating, using, selecting, or accessing. For example, determining a value, a characteristic, a parameter, or a signal may include actively generating or calculating a value, a characteristic, a parameter, or a signal or may include using, selecting, or accessing a value, a characteristic, a parameter, or a signal that is already generated, such as by a component or a device.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the electronic device 500 of FIG. 5.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the method 400 of FIG. 4 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A method of operation of a receiver device, the method comprising:
   receiving a signal at the receiver device via a channel from a transmitter device, the signal comprising multiple modulation symbols;
   determining a frequency domain representation of the signal;
   detecting a first symbol of the signal;
   determining a time domain representation of a distortion estimate associated with the first symbol using a distortion recovery receiver (DRR) technique;
   subtracting the distortion estimate from the first symbol to generate an updated estimate of the first symbol; and
   determining a frequency domain representation of a second symbol of the signal using a value that is based on a frequency domain representation of the distortion estimate and that is further based on a frequency domain representation of a quantized version of the updated estimate of the first symbol.

2. The method of claim 1, wherein the first symbol is included in a first stream of N streams, wherein the second symbol is included in a second stream of the N streams, and wherein N indicates any integer greater than one.

3. The method of claim 1, wherein determining the distortion estimate using the DRR technique includes accessing a power amplifier (PA) non-linearity lookup table.

4. The method of claim 1, wherein the first symbol and the second symbol are determined in accordance with a non-linear decision feedback equalization (DFE) technique.

5. The method of claim 1, further comprising demodulating the signal by the receiver device using a non-linear technique.

6. The method of claim 1, further comprising:
   providing the updated estimate of the first symbol to a quadrature amplitude modulation (QAM) demodulator; and
   demodulating the updated estimate using the quadrature amplitude modulation (QAM) demodulator.

7. The method of claim 1, wherein the signal is based on orthogonal frequency division multiplexing (OFDM).

8. The method of claim 1, further comprising:
   performing a scaling operation based on the value to generate a second value associated with one or more processed streams; and
   determining the second symbol based on the second value.

9. An apparatus comprising:
   a distortion estimation circuit configured to determine, based on a first symbol of a signal, a time domain representation of a distortion estimate of the first symbol using a distortion recovery receiver (DRR) technique;
   a subtraction circuit configured to subtract a frequency domain representation of the distortion estimate from a frequency domain representation of the first symbol to generate an updated estimate of the first symbol; and
   a symbol estimation circuit configured to determine a frequency domain representation of a second symbol of the signal using a value that is based on the frequency domain representation of the distortion estimate and that is further based on a frequency domain representation of a quantized version of the updated estimate of the first symbol.

10. The apparatus of claim 9, further comprising an inverse fast Fourier transform (IFFT) circuit coupled to an input of the distortion estimation circuit and configured to determine a time domain representation of the first symbol.

11. The apparatus of claim 9, further comprising a fast Fourier transform (FFT) circuit coupled to an output of the distortion estimation circuit and configured to determine the frequency domain representation of the distortion estimate.

12. The apparatus of claim 11, further comprising:
   a slicer circuit coupled to an output of the subtraction circuit and configured to generate a sliced value based on the updated estimate of the first symbol; and
   an addition circuit coupled to an output of the FFT circuit and to an output of the slicer circuit and configured to generate the value based on the sliced value and the frequency domain representation of the distortion estimate.

13. The apparatus of claim 9, wherein the distortion estimation circuit comprises:
   a first subtraction circuit configured to generate a feedforward value; and
   a lookup table circuit configured to determine a lookup value based on the feedforward value.

14. The apparatus of claim 13, wherein the distortion estimation circuit further comprises a second subtraction circuit configured to subtract the feedforward value from the lookup value to generate the time domain representation of the distortion estimate.

15. The apparatus of claim 9, further comprising a demodulator configured to demodulate the updated estimate of the first symbol and to demodulate an updated estimate of the second symbol.

16. The apparatus of claim 15, wherein the updated estimate of the first symbol corresponds to a quadrature amplitude modulation (QAM) symbol, and wherein the demodulator is configured to demodulate QAM symbols.

17. An apparatus comprising:
   means for determining, based on a first symbol of a signal, a time domain representation of a distortion estimate of the first symbol using a distortion recovery receiver (DRR) technique;
   means for subtracting a frequency domain representation of the distortion estimate from a frequency domain representation of the first symbol to generate an updated estimate of the first symbol; and means for determining a frequency domain representation of a second symbol of the signal using a value that is based on the frequency domain representation of the distortion estimate and that is further based on a frequency domain representation of a quantized version of the updated estimate of the first symbol.

18. The apparatus of claim 17, further comprising means for determining a time domain representation of the first symbol.

19. The apparatus of claim 17, further comprising means for determining the frequency domain representation of the distortion estimate.

20. The apparatus of claim 17, further comprising means for generating a sliced value based on the updated estimate of the first symbol.

21. The apparatus of claim 20, further comprising means for generating the value based on the sliced value and the frequency domain representation of the distortion estimate.

22. The apparatus of claim 17, further comprising means for demodulating the updated estimate of the first symbol and for demodulating an updated estimate of the second symbol.

\* \* \* \* \*